Patented Dec. 22, 1942

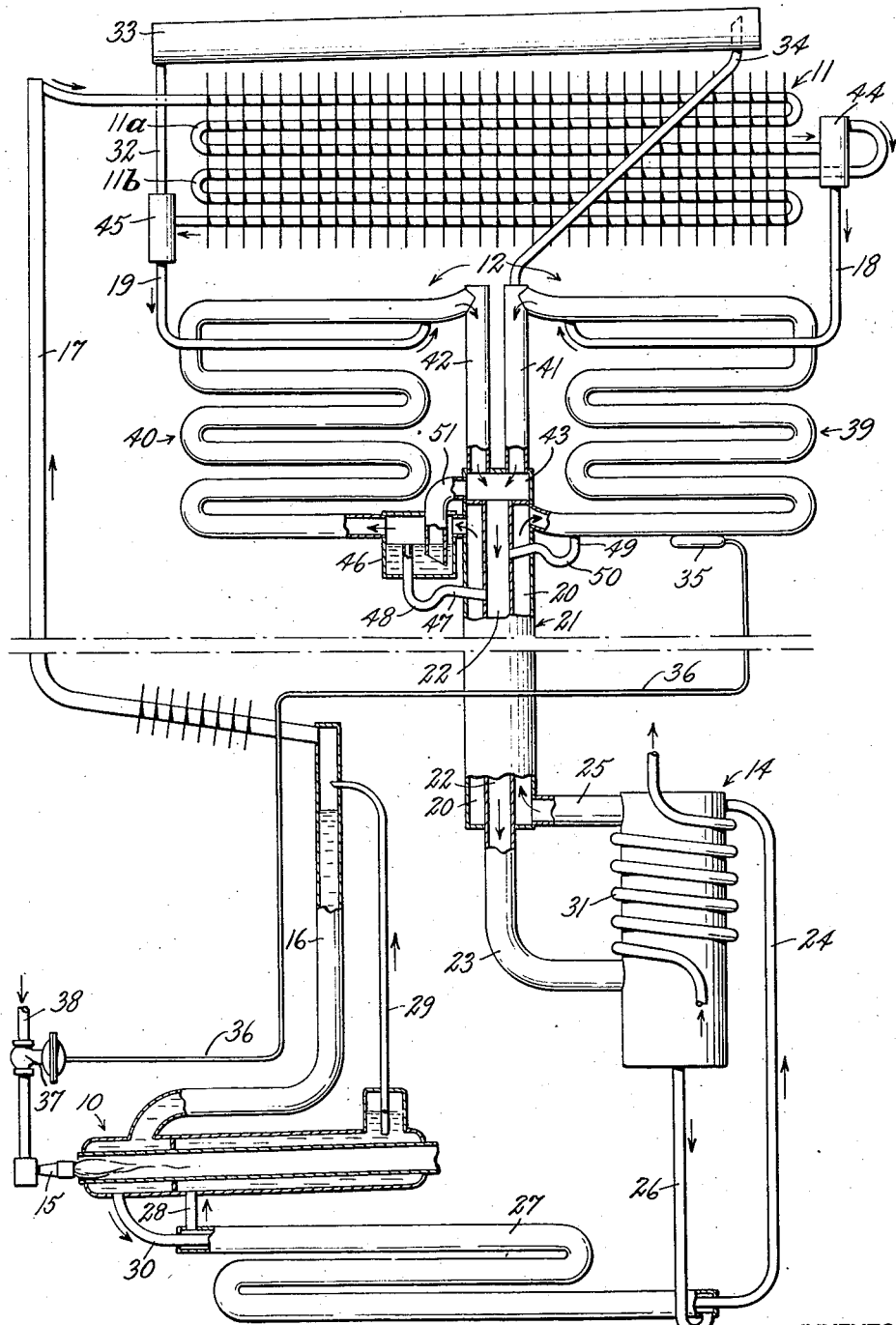

2,306,199

UNITED STATES PATENT OFFICE 2,306,199

REFRIGERATION

Hugo M. Ullstrand, Stockholm, Sweden, assignor to Servel, Inc., New York, N. Y., a corporation of Delaware Application June 4, 1938, Serial No. 211,749

8 Claims. (Cl. 62—5)

My invention relates to refrigeration, and more particularly to refrigeration systems of the kind employing an inert gas or pressure equalizing agent.

In refrigeration systems of this kind liquid refrigerant fluid flows from a condenser and evaporates and diffuses into an inert gas in an evaporator or cooling element to produce a refrigerating effect. The resulting rich gas mixture of refrigerant and inert gas flows in a gas circuit from the cooling element to an absorber in which refrigerant gas is absorbed into absorbent. Inert gas weak in refrigerant flows in the gas circuit from the absorber back to the cooling element and preferably in heat exchange relation with rich gas flowing to the absorber.

It is an object of my invention to provide improved circulation of fluid in systems of the above-mentioned type having a plurality of cooling elements. This is accomplished by supplying liquid refrigerant fluid from a first part of a condenser to one of a plurality of cooling elements connected in parallel in a gas circuit, and supplying liquid refrigerant fluid consecutively to one or more other cooling elements from subsequent portions of the condenser.

It is another object of the invention to provide an improvement for controlling the circulation of inert gas or pressure equalizing agent in systems of the above-mentioned type having a plurality of cooling elements. This is accomplished by automatically effecting a reduction in the flow of inert gas in the gas circuit when the load is reduced, thereby improving the efficiency of the refrigeration system.

The invention, together with the above and other objects and advantages thereof, will be more fully understood upon reference to the following description and accompanying drawing forming a part of this specification, and in which the single figure illustrates more or less diagrammatically a refrigeration system embodying the invention.

In the drawing the invention is embodied in an absorption refrigeration system of a type containing a pressure equalizing agent. Such a system includes a generator 10, condenser 11, a cooling unit 12, and an absorber 14 which are interconnected in a manner well-known in the art and which will briefly be described hereinafter. The system contains a solution of refrigerant in absorption liquid, such as ammonia in water, for example, and also an auxiliary agent or inert gas, such as hydrogen.

The generator 10 is heated in any suitable manner, as by a gas burner 15, for example, whereby refrigerant vapor is expelled from solution in generator 10. The refrigerant vapor flows upward through a stand-pipe 16 and a conduit 17 into the condenser 11 in which it is liquefied. Liquid refrigerant flows from condenser 11 into cooling unit 12 through conduits 18 and 19, as will be described hereinafter.

Refrigerant fluid in cooling unit 12 evaporates and diffuses into inert gas which enters from the upper end of an outer conduit 20 of gas heat exchanger 21. Due to evaporation of refrigerant fluid into inert gas, a refrigerating effect is produced with consequent absorption of heat from the surroundings. The rich gas mixture of refrigerant vapor and inert gas formed in cooling unit 12 flows from the upper parts thereof through the inner conduit 22 of gas heat exchanger 21 and conduit 23 into the lower part of absorber 14.

In absorber 14 the rich gas mixture flows counter-current to downwardly flowing weak absorption liquid which enters through a conduit 24. The absorption liquid absorbs refrigerant vapor from the inert gas, and inert gas weak in refrigerant flows from absorber 14 through a conduit 25 and outer conduit 20 of gas heat exchanger 21 into the lower parts of cooling unit 12.

The circulation of gas in the gas circuit just described is due to the difference in specific weight of the columns of rich and weak gas in the inner and outer conduits 22 and 20, respectively, of the gas heat exchanger 21. Since the rich gas is heavier than the weak gas, a force is produced or developed for causing flow of rich gas toward absorber 14 and flow of weak gas toward cooling unit 12.

Absorption liquid enriched in refrigerant flows from the lower part of absorber 14 through a conduit 26, outer passage of a liquid heat exchanger 27, and conduit 28 into generator 10. Liquid is raised in the generator by a thermo-siphon tube 29 and flows back to the generator through stand-pipe 16. The refrigerant vapor expelled out of solution in generator 10, together with refrigerant vapor entering through thermo-siphon tube 29, flows upwardly through stand-pipe 16 and conduit 17 into condenser 11, as explained above.

The absorption liquid from which refrigerant has been expelled flows from generator 10 through conduit 30, inner passage of liquid heat exchanger 27, and conduit 24 to the upper part of absorber 14. This circulation of absorption liquid results from the raising of liquid by thermosiphon tube 29. Heat liberated with absorption of refrigerant vapor in absorber 14 is transferred to a suitable cooling medium which circulates through a coil 31 arranged in thermal exchange relation with the absorber.

The lower end of condenser 11 is connected by conduit 32, vessel 33, and conduit 34 to the gas circuit, so that any inert gas which may pass through the condenser can flow into the gas circuit. Refrigerant vapor not liquefied in the condenser flows through conduit 32 to displace inert gas in vessel 33 and force such gas through conduit 34 into the gas circuit. By forcing gas into the gas circuit in this manner, the total pressure in the system is raised whereby an adequate condensing pressure is obtained to insure condensation of refrigerant vapor in condenser 11.

The refrigeration system just described may be controlled by a thermal bulb 35 which is affected by a temperature condition of cooling unit 12. As shown, the thermal bulb 35 is arranged in thermal exchange relation with a bottom part of cooling unit 12 and connected by a conduit 36 to a control device 37 which is connected in a fuel supply conduit 38 of burner 15. The thermal bulb 35 and conduit 36 may form part of an expansible fluid thermostat which is charged with a suitable volatile fluid and responds to changes of temperature of cooling unit 12 to operate control device 37, in a manner well-known in the art.

When the temperature of cooling unit 12 increases due, for instance, to increase in heat load caused by placing of warm material in the refrigerator, or rise in room air temperature, the thermal bulb 35 becomes effective to operate control device 37 to increase the supply of fuel to burner 15. This increases the heat input and hence the rate at which refrigerant vapor is expelled from solution in generator 10, thereby increasing the amount of refrigerant vapor which condenses in condenser 11 and flows into cooling unit 12. Conversely, when the temperature of cooling unit 12 decreases, the thermal bulb 35 becomes effective to operate control device 37 to decrease the supply of fuel to burner 15. This reduces the heat input and hence rate at which refrigerant vapor is expelled from solution in generator 10, thereby decreasing the amount of refrigerant vapor which condenses in condenser 11 and flows into cooling unit 12.

In accordance with the invention the cooling unit 12 includes a plurality of cooling elements 39 and 40 which are connected in parallel in the gas circuit and consecutively supplied with liquid refrigerant from subsequent sections of condenser 11. The parallel connection of cooling elements 39 and 40 in the gas circuit will be readily apparent in the drawing wherein the lower ends of the cooling elements are connected to the upper end of outer conduit 20 of gas heat exchanger 21.

The upper ends of cooling elements 39 and 40 are connected by conduits 41 and 42, respectively, to a header 43 at the upper end of inner conduit 22 of gas heat exchanger 21. The lower end of conduit 34 is shown connected to the gas circuit at the upper end of conduit 41. It is to be understood, however, that conduit 34 may be connected to the gas circuit at any other convenient point.

Refrigerant vapor from generator 10 flows upward through conduit 17 into upper condenser section 11a. Refrigerant liquefied in condenser section 11a flows into gas separating chamber 44 and thence through conduit 18 into the upper part of cooling element 39. Refrigerant not liquefied in upper condenser section 11a flows from the upper part of chamber 44 into lower condenser section 11b. Refrigerant liquefied in lower condenser section 11b flows therefrom into a gas separating chamber 45 and thence through conduit 19 into the upper part of cooling element 40.

The thermal bulb 35 of the expansible fluid thermostat is shown in thermal contact with the bottom part of cooling element 39 for controlling the rate at which fuel is supplied to burner 15 and hence the heat input to generator 10.

As pointed out above, the circulation of gas in the gas circuit is effected by force produced or developed within the system, such force resulting from the difference in specific weight of the columns of rich and weak gas. A reduction in the rate of gas flow inherently takes place with a decrease in load, due to the fact that less liquid refrigerant evaporates in the cooling elements. The efficiency of the refrigeration system is improved considerably, however, when a further reduction in the rate of gas flow is effected with decrease in load, so that the rate of gas flow is better correlated to the load and the heat input to the generator 10.

By effecting a further reduction in the rate of gas flow, less weak gas flows upwardly from absorber 14. This weak gas must be cooled when it enters cooling element 39, for example. By reducing the circulation of weak gas so that it is better correlated to the load or capacity, less cooling of such gas need be effected when cooling element 39 is operating at low load and reduced heat input.

In accordance with the invention, a reduction in the rate of gas flow is effected under certain operating conditions by connecting cooling elements 39 and 40 in parallel in the gas circuit and consecutively supplying liquid refrigerant thereto from subsequent sections of condenser 11.

When the load and heat input are such that refrigerant vapor condenses in both condenser sections 11a and 11b, liquid is supplied to cooling element 40 as well as cooling element 39. In such case normal circulation of inert gas is effected through cooling elements 39 and 40 with weak gas entering the lower parts and with rich gas leaving the upper parts and flowing together in header 43.

Under certain operating conditions all of the refrigerant vapor may be condensing in upper condenser section 11a and no refrigerant vapor may be condensing in lower condenser section 11b. This will occur, for example, when the load is low and the heat input to generator 10 is reduced.

With no liquid being supplied to cooling element 40 the weak gas circulating therethrough will not be enriched with refrigerant vapor. In such case weak gas leaves the upper part of cooling element 40 and mixes in header 43 with rich gas flowing through conduit 41 from the upper part of cooling element 39. Due to such mixing of weak and rich gas, the specific weight of the column of rich gas in inner conduit 22 of gas heat exchanger 21 is reduced. This reduces the difference in specific weight between the columns of rich and weak gas, thereby lowering the force that is produced or developed within the system for causing flow of gas. This reduction in the rate of gas flow is effected automatically and better correlates the rate of gas flow with the load and the heat input to the generator, thereby improving the efficiency of the refrigeration system.

Since no evaporation of liquid into weak gas takes place in cooling element 40 when refrigerant vapor is not condensing in lower condenser section 11b, useless and unnecessary flow of weak gas through cooling element 40 may be avoided by providing a suitable by-pass. Such by-pass may include a vessel 46 at the lower end of cooling element 40 into which liquid refrigerant can flow. One end of a drain conduit 47 communicates with vessel 46 at an intermediate part thereof. The conduit 47 is bent to provide a liquid trap 48 and is connected at the other end to the inner conduit 22 of gas heat exchanger 21, whereby excess liquid may be drained from cooling element 40.

A similar drain conduit 49 having a liquid trap 50 is connected to the bottom part of cooling element 39 and to the inner conduit 22 of gas heat exchanger 21, whereby unevaporated liquid may be drained from the bottom of cooling element 39.

A conduit 51 is connected to header 43 and extends downward into vessel 46 to provide a by-pass or vent in the gas circuit. When the amount of liquid accumulated in vessel 46 is such that the lower end of conduit 51 is sealed by liquid, the by-pass conduit 51 is closed and all of the gas entering vessel 46 from conduit 20 flows through cooling element 40. When the liquid level in vessel 46 falls so that the lower end of conduit 51 is open, gas entering vessel 46 from conduit 20 will flow through conduit 51 and thereby reduce the flow of gas through cooling element 40.

With the load and heat input such that refrigerant vapor condenses in both condenser sections 11a and 11b, liquid is supplied to cooling element 40 as well as cooling element 39 and liquid may accumulate in vessel 49 to close by-pass conduit 51. In such case normal circulation of inert gas is effected through cooling elements 39 and 40 with weak gas entering the lower parts and with rich gas leaving the upper parts and flowing together in header 43.

With no liquid being supplied to cooling element 40, as at low load and with reduced heat input to generator 10, the liquid level in vessel 46 falls due to evaporation of liquid into weak gas. When the liquid level falls sufficiently in vessel 46 so that the by-pass conduit 51 opens, gas entering vessel 46 from conduit 20 will flow through conduit 51 into header 43. This reduces the flow of gas in cooling element 40 and the diverted gas flowing through conduit 51 mixes with rich gas flowing into header 43 from the upper part of cooling element 39. In this way the specific weight of the column of rich gas is reduced, thereby reducing the force developed or produced in the system for causing flow of gas in the gas circuit.

When by-pass conduit 51 is open and no liquid is flowing from lower condenser section 11b into cooling element 40, the cooling element 39 is operative to take care of the low load existing under such conditions. With increase in load, the thermal bulb 35 of the expansible fluid thermostat responds to operate control device 37 to increase the heat input to generator 10. When refrigerant vapor is condensed in lower condenser section 11b due to such increase in load and at higher heat input, by-pass conduit 51 closes due to rise of liquid in vessel 46. With increase in load, therefore, cooling element 40 becomes operative to take care of part of the load.

By connecting cooling elements 39 and 40 in parallel in the gas circuit and providing by-pass conduit 51, the liquid level in vessel 46 will fall whenever evaporation of liquid therein takes place at a faster rate than the rate at which liquid flows into the vessel. Whenever the load conditions and heat input change so that the condensation of refrigerant vapor in lower condenser section 11b is reduced, therefore, the liquid level in vessel 46 will immediately begin to fall to effect a reduction in the rate of gas circulation. As soon as the lower end of by-pass conduit 51 is open due to fall of liquid level in vessel 46, the relative rate of gas flow in cooling elements 39 and 40 will be changed. Further, in addition to reducing the flow of gas in the entire gas circuit due to by-passing of gas through conduit 51, the flow of gas in cooling element 40 will be reduced.

While a single embodiment of the invention has been shown and described, such variations and modifications are contemplated as fall within the true spirit and scope of the invention, as pointed out in the following claims.

What is claimed is:

1. In a method of refrigeration with the aid of a system having a circuit for inert gas including a plurality of places of evaporation and in which circulation of inert gas is due to the difference in specific weight of columns of gaseous fluid, the improvement which consists in flowing liquid refrigerant to said places of evaporation, flowing inert gas through said places of evaporation in parallel, and decreasing the difference in specific weight of said columns of gaseous fluid to reduce the rate of gas circulation by reducing the flow of liquid refrigerant to one of said places of evaporation relative to the flow of liquid refrigerant to another of said places of evaporation.

2. In a method of refrigeration with the aid of a system having a circuit including a plurality of evaporators in parallel for circulation of inert gas, that improvement which consists in accumulating liquid refrigerant at a place of accumulation, and reducing the circulation of inert gas through one of said evaporators relative to the circulation of inert gas through another of said evaporators with decrease in the amount of liquid refrigerant at said place of accumulation.

3. In a method of refrigeration with the aid of a system having a circuit for inert gas including a plurality of evaporators and in which circulation of inert gas is due to the difference in specific weight of columns of gaseous fluid rich and weak, respectively, in refrigerant vapor, that improvement which consists in circulating inert gas through said evaporators in parallel, accumulating liquid refrigerant at a place of accumulation, and, with decrease in the amount of liquid regrigerant at said place of accumulation, diverting weak gas flowing to one of said evaporators and flowing such diverted gas into the column of gaseous fluid rich in refrigerant vapor.

4. A refrigeration system including a plurality of cooling elements, means to conduct liquid refrigerant to said cooling elements, connections for circulation of inert gas through said cooling elements, means for receiving liquid and holding such liquid in contact with circulating inert gas, and means responsive to level of liquid in said receiving means to vary relative to each other the relative amounts of inert gas circulating respectively through said cooling elements.

5. A refrigeration system including an inert gas circuit having a plurality of cooling elements connected in parallel, a by-pass connection for inert gas around one of said cooling elements, and means for controlling said by-pass connection.

6. A refrigeration system including an inert gas circuit having a plurality of cooling elements connected in parallel and through which circulation of gas is effected by the difference in specific weight of columns of gaseous fluid rich and weak, respectively, in refrigerant vapor, a by-pass connection around one of said cooling elements to permit flow of gas from said column weak in refrigerant vapor to said column rich in refrigerant vapor, and means for controlling said by-pass connection.

7. A refrigeration system including an inert gas circuit having a plurality of cooling elements, means to conduct liquid refrigerant to said cooling elements, an inert gas circuit including said cooling elements and through which gas circulates, circulation of inert gas in said circuit being due to the difference in specific weight of columns of gaseous fluid rich and weak, respectively, in refrigerant vapor formed in said cooling elements, means for receiving liquid refrigerant and holding such liquid in contact with circulating inert gas, a by-pass connection around one only of said cooling elements to permit flow of gas from said column weak in refrigerant vapor to said column rich in refrigerant vapor, and means responsive to level of liquid in said receiving means for controlling said by-pass connection.

8. A refrigeration system including an inert gas circuit having a plurality of cooling elements connected in parallel and an absorber, refrigerant fluid liquefying means for supplying refrigerant liquid individually to said cooling elements, and structure in said gas circuit operative to decrease rate of gas circulation in said circuit when supply of refrigerant liquid to one of said cooling elements stops.

HUGO M. ULLSTRAND.